United States Patent
Yeh

(10) Patent No.: US 9,274,661 B2
(45) Date of Patent: Mar. 1, 2016

(54) TOUCH SENSING CIRCUIT, APPARATUS, AND SYSTEM AND OPERATING METHOD THEREOF

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 252 days.

(21) Appl. No.: 14/140,783

(22) Filed: Dec. 26, 2013

(65) Prior Publication Data

US 2014/0184563 A1  Jul. 3, 2014

(30) Foreign Application Priority Data

Dec. 28, 2012 (TW) .............................. 101150819 A

(51) Int. Cl.
*G06F 3/041* (2006.01)
*G06F 3/044* (2006.01)
*G06F 1/32* (2006.01)

(52) U.S. Cl.
CPC .............. *G06F 3/044* (2013.01); *G06F 1/3231* (2013.01); *G06F 1/3262* (2013.01); *Y02B 60/1289* (2013.01)

(58) Field of Classification Search
None
See application file for complete search history.

(56) References Cited

U.S. PATENT DOCUMENTS

| | | | | |
|---|---|---|---|---|
| 2002/0121146 A1* | 9/2002 | Manaresi | ................. | B63H 9/06 73/862.68 |
| 2005/0088416 A1* | 4/2005 | Hollingsworth | .......... | G06F 3/02 345/173 |
| 2006/0017705 A1* | 1/2006 | Yoshikawa | .............. | G06F 3/016 345/173 |
| 2008/0158174 A1* | 7/2008 | Land | ..................... | G06F 3/0418 345/173 |
| 2009/0086517 A1* | 4/2009 | Wei | ........................ | H02M 3/156 363/50 |
| 2010/0134437 A1* | 6/2010 | Yang | ..................... | G06F 1/3203 345/174 |
| 2012/0071149 A1* | 3/2012 | Bandyopadhyay | ... | G06F 1/1643 455/418 |
| 2012/0127136 A1* | 5/2012 | Schneider | ........... | G02F 1/13718 345/204 |
| 2012/0162133 A1* | 6/2012 | Chen | ..................... | G06F 3/0418 345/174 |
| 2012/0162134 A1* | 6/2012 | Chen | ....................... | G06F 3/044 345/174 |
| 2012/0262387 A1* | 10/2012 | Mizuhashi | .............. | G06F 3/044 345/173 |

* cited by examiner

*Primary Examiner* — Seokyun Moon
*Assistant Examiner* — Josemarie G Acha, III
(74) *Attorney, Agent, or Firm* — WPAT, PC; Justin King

(57) ABSTRACT

A touch sensing circuit is provided. The circuit is configured to connect to a conducting wire in a touch area for measuring a signal variation. In a driving mode, the wire is coupled to AC voltage. If a first voltage variation which exceeds a first threshold is measured by the circuit, it is determined that something is approaching the touch area near the wire. In a passive mode, the wire is coupled to DC voltage. If a second voltage variation which exceeds a second threshold is measured by the circuit, it is determined that something is approaching the touch area near the wire. When measuring the second voltage variation, no AC voltage is coupled to the wire.

18 Claims, 11 Drawing Sheets

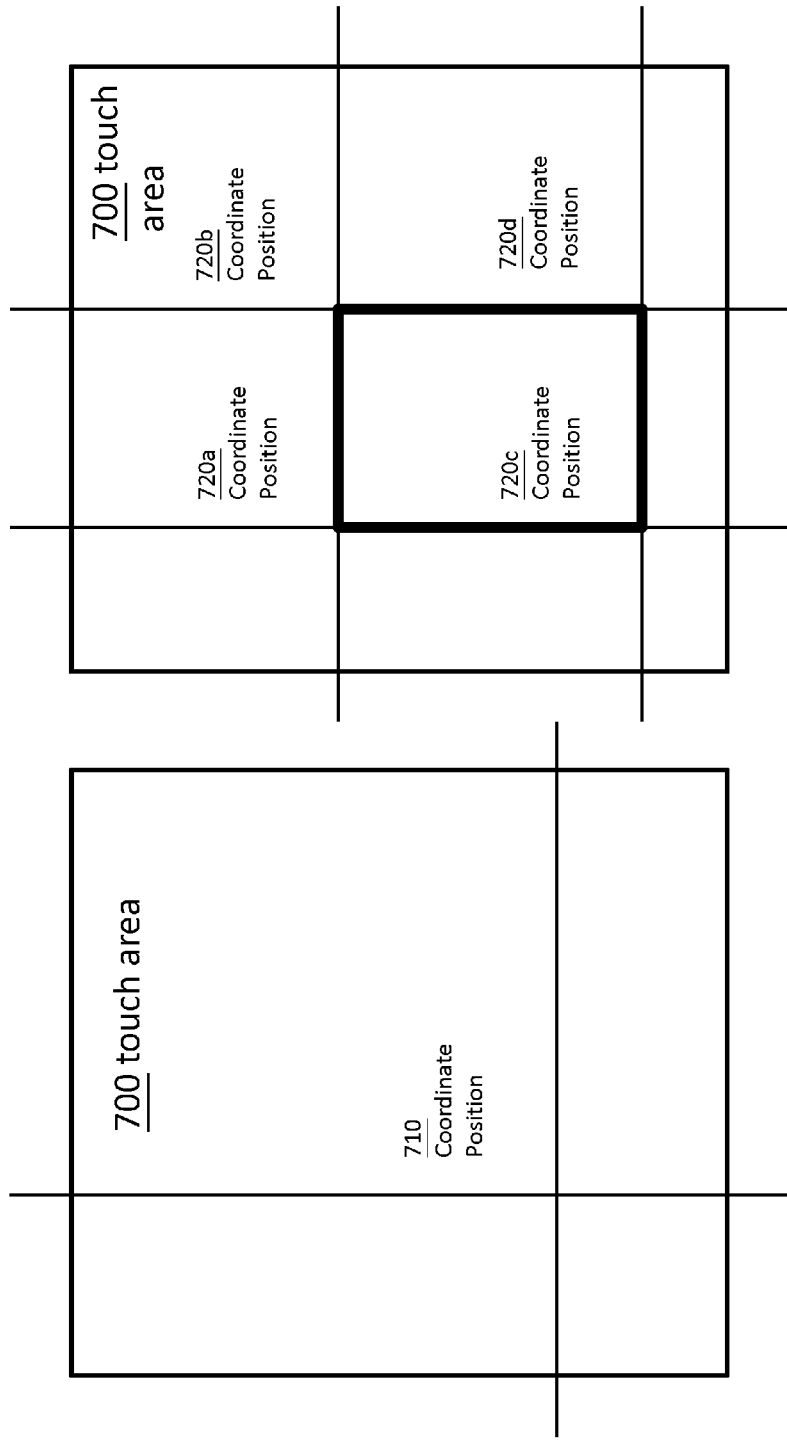

TOUCH SENSING CIRCUIT, APPARATUS, AND SYSTEM AND OPERATING METHOD THEREOF

BACKGROUND OF THE INVENTION

1. Field of the Invention

The present invention relates to a touch sensing system, and more particularly, to a touch sensing system with a passive mode.

2. Description of the Prior Art

Touch sensing interfaces is one of the important human-machine interfaces for electronic systems. They are widely used in many electronic devices, such as smart phones, laptops, Tablet PCs, and the like. Consumer electronic products that are vital to modern life frequently utilize touch panels as the main human-machine interfaces.

It is well known that an electronic system with touch sensing functionality includes a touch area with which the finger(s) of a user or a stylus can make contact. In general, existing touch sensing systems may be resistive, capacitive, optical, surface-acoustic-wave techniques. Among these techniques, capacitive touch control techniques are mostly used in small/medium sized touch screens, and thus becoming the mainstream techniques with large amount of applications in the market.

Referring now to FIG. 1, a smart phone or a tablet device 100 of the prior art is shown. The device 10 includes a housing 110. The main human-machine interfaces on the housing are a touch screen 120 and at least one button 130. The role of the button 130 is limited to turning on/off the device 100 or the touch screen 120. A user operates all the functions of the device 100 through the touch screen 120.

The touch screen 120 using the capacitive touch sensing technique usually includes a touch panel stacked on top of the screen for allowing the user's hand or stylus to make contact with. The touch panel includes a plurality of conducting wires therein. Each conducting wire is coupled to a touch sensing circuit in a touch sensing device.

There are generally two types of capacitive touch sensing techniques: one is called mutual capacitive technique, and the other is called self capacitive technique. Both of these techniques determine the location of a touch point by measuring a voltage drop of a driving voltage as a result of capacitive variation on a conducting wire touched or approached by the finger or stylus. Both of these techniques rely on the touch sensing circuit coupled to the conducting wires to apply a driving voltage. When supplying this driving voltage, the capacitive touch system has to continuously consume power in order to provide the voltage on the conducting wires.

Referring to FIG. 2, a state diagram of a capacitive touch system of the prior art is shown. On a battery-powered mobile device 100, during continuous use, the capacitive touch system has to remain in a driving mode 210. In the state of this driving mode 210, a driving voltage is provided to the conducting wires in the touch area so as to measure the input of the user. In order to conserve power, after an idle period in which no user input is received, or when a user's instruction is received, the electronic device 100 will turn off its touch screen 120, and the capacitive touch system is made to enter into a stop mode 220.

In the stop mode 220, since no driving voltage is provided to the conducting wires in the touch area, the touch sensing system cannot measure any input of the user made in the touch area, but it also saves power used by the touch sensing system otherwise. When the user wishes to wake up the device 100, she/he has to use other input or sensor on the device 100 to do that. One convenient way is to press the button 130, and the device 100 will start up the touch sensing system and return into the state of the driving mode 210.

The design of the button 130 is usually mechanical having a movable part that allows the user to feel the contact pressure. Since the button 130 has a movable part, compared to other components without any movable part in the device 100, the use lifespan of the button 130 may be the shortest. In addition, because the button 130 has a movable part therein, in terms of waterproof and dustproof abilities, it is poorer than other components that are encapsulated by the housing 110. Therefore, the button 130 is the "Achilles' tendon" in the device 100. When the button 130 is faulty, the user may not be able to wake up the device 100 that is in the stop mode 220.

Therefore, if the main input component, that is, the touch screen 120 in the device is able to enter into a more power-saving mode, then it may be possible to eliminate the button 130 from the device 100. Alternatively, if, at least, the number of buttons 130 is minimized, or the frequency of use of the button 130 is minimized, and the device 100 is woken up directly via the touch screen 120, the overall lifespan or mean time between failures can be lengthened. The probability of accidental failure as a result of water or dust permeation can be considerably reduced.

SUMMARY OF THE INVENTION

An embodiment of the present invention provides a touch sensing circuit connected to a conducting wire in a touch area for measuring a signal variation of the conducting wire. In a driving mode, the touch sensing circuit allows the conducting wire to be coupled to an AC voltage, and if the touch sensing circuit measures a first voltage variation exceeding a first threshold, determines an object is approaching the touch area near the conducting wire. In a passive mode, the touch sensing circuit allows the conducting wire to be coupled to a DC voltage, and if the touch sensing circuit measures a second voltage variation exceeding a second threshold, determines an object is approaching the touch area near the conducting wire, wherein in measuring the second voltage variation, no AC voltage is provided to the conducting wire.

Another embodiment of the present invention provides a touch sensing device, which may include a plurality of touch sensing circuits, each touch sensing circuit connected to one of a plurality of conducting wires in a touch area for measuring a signal variation of the corresponding conducting wire. In a driving mode, each touch sensing circuit allows the corresponding conducting wire to be coupled to an AC voltage, and if a first touch sensing circuit measures a first voltage variation on a first conducting wire exceeding a first threshold, determines an object is approaching the touch area near the first conducting wire. In a passive mode, each touch sensing circuit allows the corresponding conducting wire to be coupled to a DC voltage, and if a first touch sensing circuit measures a second voltage variation on a first conducting wire exceeding a second threshold, determines an object is approaching the touch area near the first conducting wire, wherein in measuring the second voltage variation, no AC voltage is provided to the conducting wire.

Still another embodiment of the present invention provides a touch sensing system, which may include a plurality of conducting wires covering a touch area; and a touch sensing device. The touch sensing device may include a plurality of touch sensing circuits. Each touch sensing circuit is connected to one of a plurality of conducting wires in a touch area for measuring a signal variation of the corresponding conducting wire. In a driving mode, each touch sensing circuit allows the corresponding conducting wire to be coupled to an AC voltage, and if a first touch sensing circuit measures a first voltage variation on a first conducting wire exceeding a first threshold, determines an object is approaching the touch area near the first conducting wire. In a passive mode, each touch sensing circuit allows the corresponding conducting wire to be coupled to a DC voltage, and if a first touch sensing circuit measures a second voltage variation on a first conducting wire exceeding a second threshold, determines an object is approaching the touch area near the first conducting wire, wherein in measuring the second voltage variation, no AC voltage is provided to the conducting wire.

An embodiment of the present invention provides a touch sensing method applicable for measuring a signal variation of a conducting wire in a touch area. The touch sensing method may include: switching to a driving mode to allow the conducting wire to be coupled to an AC voltage, and if measuring a first voltage variation exceeding a first threshold, determining an object is approaching the touch area near the conducting wire; and switching to a passive mode to allow the conducting wire to be coupled to a DC voltage, and if measuring a second voltage variation exceeding a second threshold, determining an object is approaching the touch area near the conducting wire, wherein in measuring the second voltage variation, no AC voltage is provided to the conducting wire.

Another embodiment of the present invention provides a touch sensing method applicable to a touch sensing device. The touch sensing device is connected to a plurality of sequentially arranged conducting wires for measuring a signal variation of each of the conducting wires. The touch sensing method may include: switching to a driving mode to allow each of the conducting wires to be coupled to an AC voltage, and if measuring a first voltage variation on a first conducting wire exceeding a first threshold, determining an object is approaching the touch area near the first conducting wire; and switching to a passive mode to allow each of the conducting wires to be coupled to a DC voltage, and if measuring a second voltage variation on the first conducting wire exceeding a second threshold, determining an object is approaching the touch area near the first conducting wire, wherein in measuring the second voltage variation, no AC voltage is provided to any of the conducting wires.

BRIEF DESCRIPTION OF THE DRAWINGS

The present invention can be more fully understood by reading the following detailed description of the preferred embodiments, with reference made to the accompanying drawings, wherein:

FIG. 7A is a schematic diagram illustrating single touch input under the passive mode.

FIG. 7B is a schematic diagram illustrating two touch input under the passive mode.

DETAILED DESCRIPTION OF THE PREFERRED EMBODIMENTS

Figure 1:
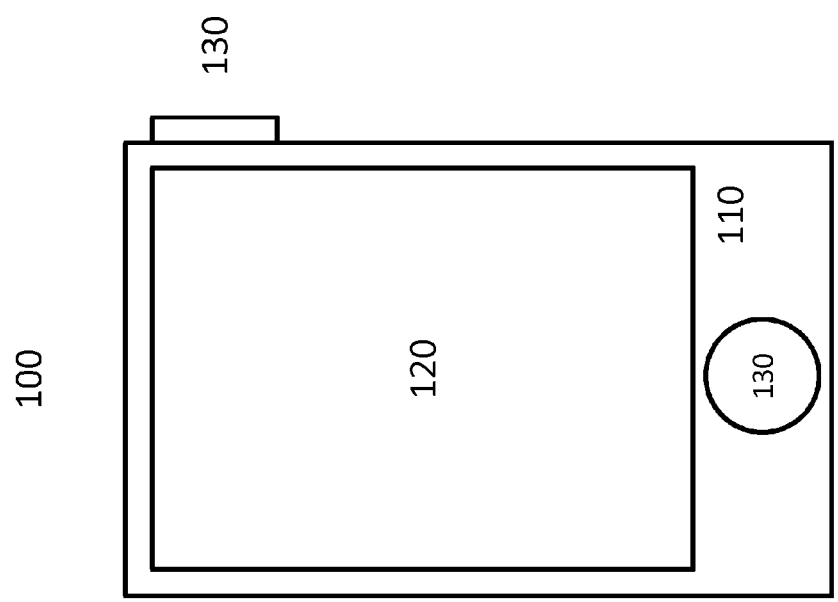
FIG. 1 is a smart phone or a tablet device of the prior art.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 2:
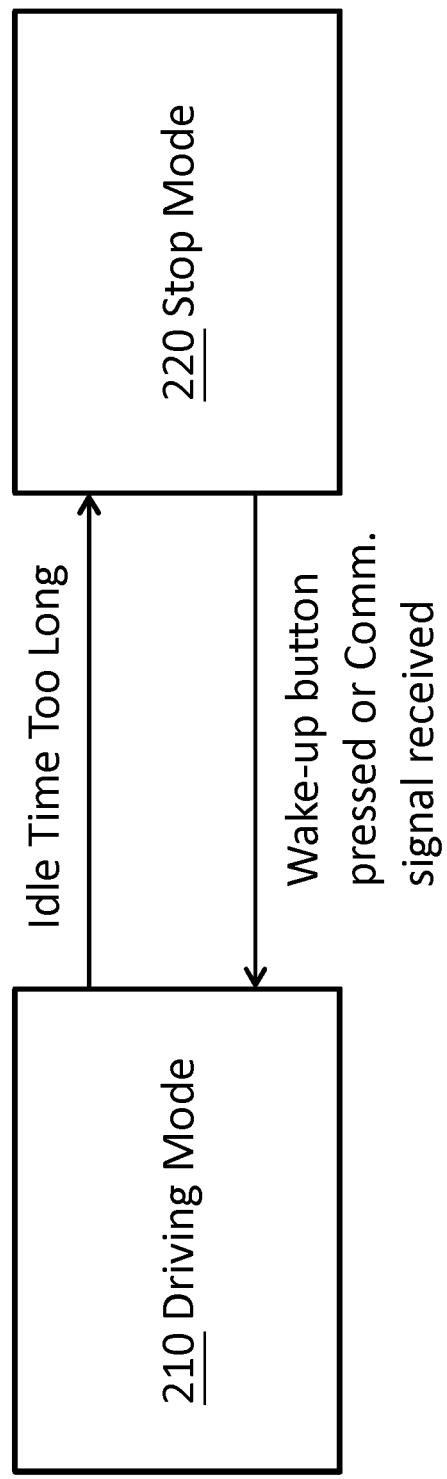
FIG. 2 is a state diagram of a capacitive touch system of the prior art.
Figure 3:
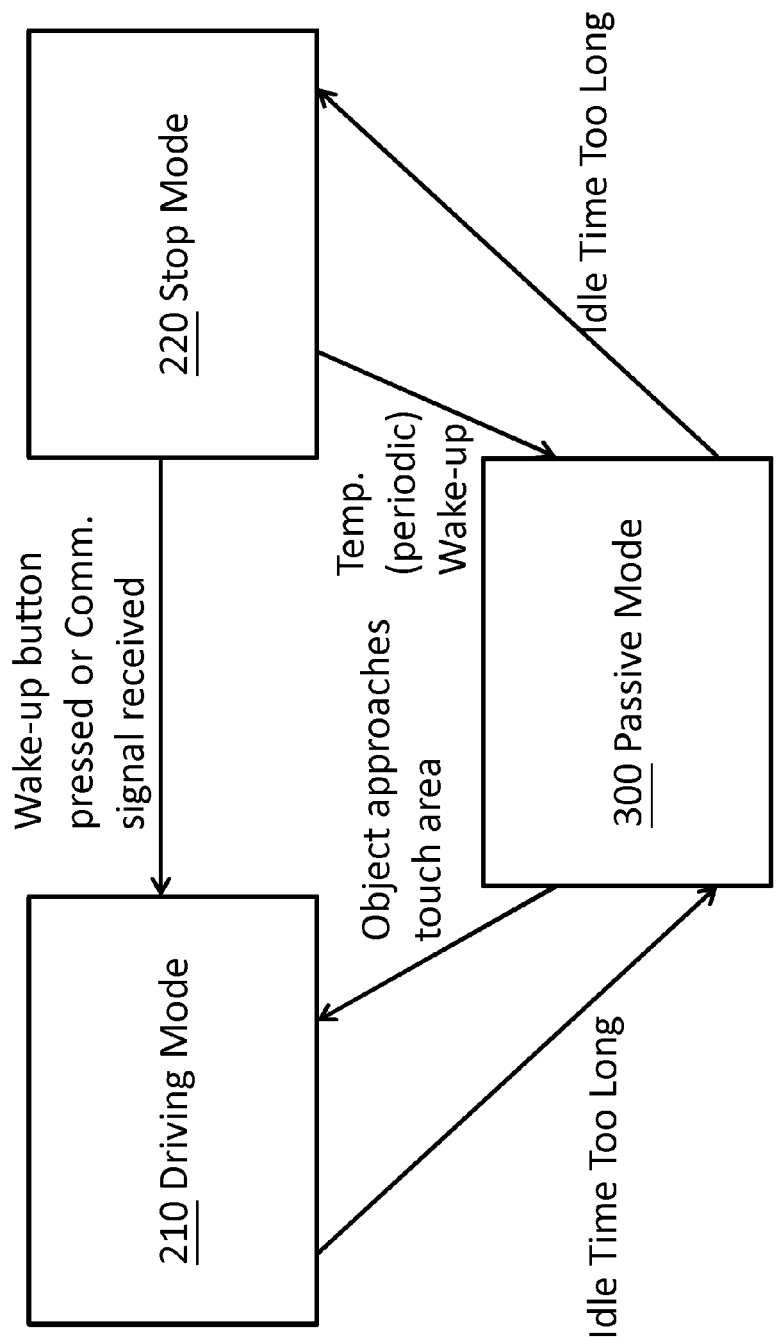
FIG. 3 is a schematic diagram depicting the operating modes of an electronic device in accordance with an embodiment of the present invention.

Referring to FIG. 3, a schematic diagram depicting the operating modes of an electronic device in accordance with an embodiment of the best mode of the present invention is shown. Compared to the prior art of FIG. 2, an electronic device of this embodiment further includes a passive mode 300. A touch system in this passive mode 300 consumes less power than the above driving mode 210, but more power than the stop mode 220. Compared to the prior art of FIG. 2, some situations requiring switching to the driving mode 210 can now be switched to the passive mode 300 to conserve power.

After being idle in the driving mode 210 for a period of time, if the user does not make any input into the touch system, the touch system will switch from the driving mode 210 to the passive mode 300 to save power. When in the passive mode 300, if the touch system detects any object approaching the touch area, it will switch back to the driving mode 210.

After being idle in the passive mode 300 for a period of time, if the user does not make any input into the touch system, the touch system will switch from the passive mode 300 to the stop mode 220 to save power. The stop mode 220 will periodically wake up to revert back to the passive mode 300 in order to detect input to the touch system made by the user.

If being idle in the passive mode 300 for a period of time, the touch system will again switch from the passive mode 300 to the stop mode 220. Of course, when the touch system is in the stop mode 220, if the electronic device receives a wake-up key or a communication signal, or when the precise input of an instruction by the user via the touch system is needed, the touch system will directly jump from the stop mode 220 to the driving mode 210.

In an embodiment, the switching of modes shown in FIG. 3 can be controlled by a software operating system of the electronic device. In other words, an operating system executed by a main processor integrates the interrupt events and processes of all inputs/outputs and timers. The switching of modes of the touch system is controlled by the main processor giving commands to the touch system. In another embodiment, an I/O system of the electronic device integrates the interrupt events and processes of all inputs/outputs and timers, so the switching of modes of the touch system can be controlled directly by the I/O system.

One with ordinary skill in the art can appreciate that the switching of modes shown in FIG. 3 can be implemented by any software, hardware, or a combination of software and hardware, and is not limited by this specification.

It should be noted that, if a small consumption of power is not a consideration, in another embodiment of the present invention, the touch system may reside between the driving mode 210 and the passive mode 300. In this embodiment, the touch system can detect input events of the touch area at any time.

Referring to FIG. 4, a schematic diagram illustrating a touch sensing circuit in accordance with an embodiment of the present invention is shown. The touch sensing circuit 410 is used to connect to a conducting wire 420 in a touch area 430 for sensing and outputting voltage variations 414 on the conducting wire 420. One of the various operating modes 412 shown in FIG. 3 will be introduced externally.

Figure 4A:
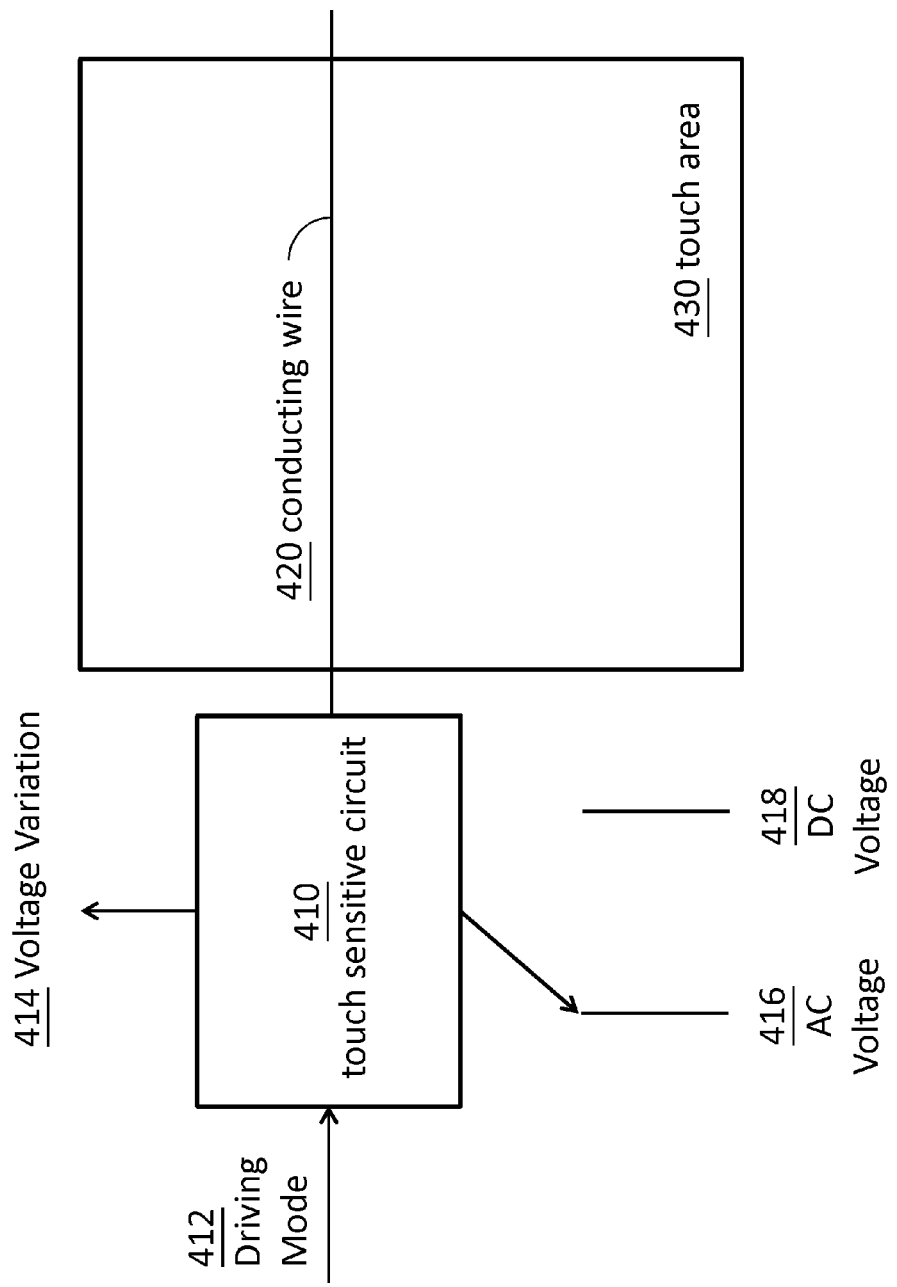
FIG. 4A is a schematic diagram illustrating a touch sensing circuit in accordance with the present invention.

In the embodiment shown in FIG. 4A, the external world puts the touch sensing circuit 410 in the driving mode. In the driving mode, the touch sensing circuit 410 allows the conducting wire 420 to couple to an AC voltage 416. If a first voltage variation which exceeds a first threshold is measured by the touch sensing circuit 410, it is determined that something is approaching the touch area 430 near the wire 420.

One with ordinary skill in the art can appreciate that measuring of the voltage variations of the conducting wire 420 can be carried out using a combination of components such as differential amplifiers, integrators, sample and hold circuits and etc. Since the main focus of the present invention is not on the components, they will not be further described.

Figure 4B:
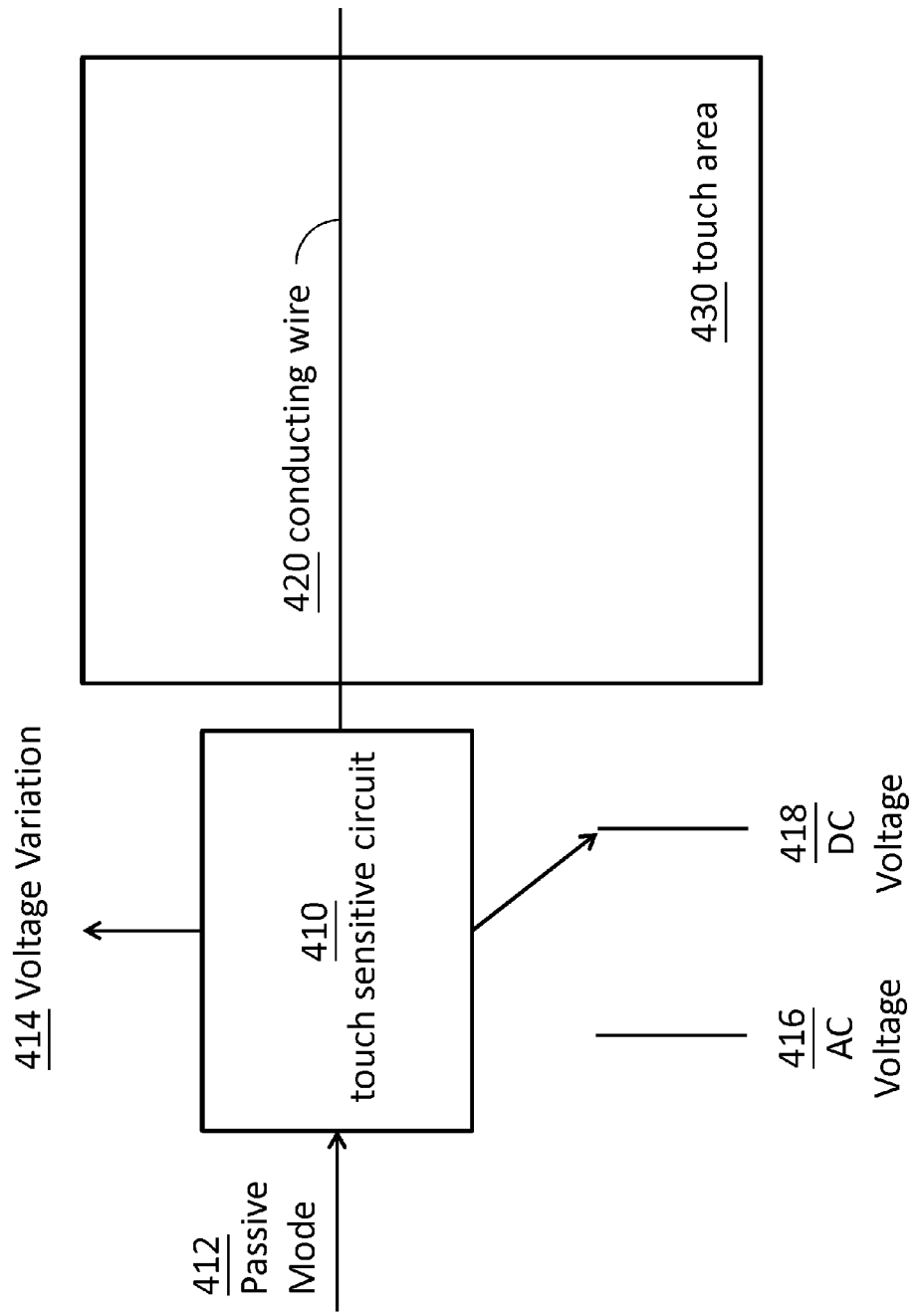
FIG. 4B is a schematic diagram illustrating the touch sensing circuit of FIG. 4A in a passive mode.

Referring to FIG. 4B, a schematic diagram illustrating the touch sensing circuit 410 of FIG. 4A in the passive mode is shown. Compared to FIG. 4A, the operating mode 412 externally introduced is the passive mode. In the passive mode, the touch sensing circuit 410 allows the conducting wire 420 to couple to a DC voltage 418. If a second voltage variation which exceeds a second threshold is measured by the touch sensing circuit 410, it is determined that something is approaching the touch area 430 near the wire 420.

In this embodiment, when the touch sensing circuit 410 is measuring the second voltage variation, no AC voltage 416 is coupled to the wire 420. In an embodiment, the DC voltage 418 is at ground potential. In another embodiment, the absolute value of the DC voltage 418 is lower than the absolute value of the AC voltage 416. Thus, when the circuit is in the passive mode, it consumes less power than in the driving mode. In the embodiment where the DC voltage 418 is at ground potential, the quantity of power consumed is at minimum. Moreover, since the absolute value of the DC voltage 418 is lower than the absolute value of the AC voltage 416, the second threshold corresponding to the DC voltage 418 is smaller than the first threshold corresponding to the AC voltage 416.

When the conducting wire is connected to the DC voltage 418, if a body part of a user touches the touch area 430 near the conducting wire 420, there will be a potential difference between the potential of the human body and the DC voltage 418. When this potential difference is greater than the second threshold, the touch sensing circuit 410 will not regard this potential difference as external noise or interference, rather as an electronic pulse caused by human body part touching the touch area 430.

In particular, modern people are often inside or near buildings with electricity mains distribution. Power grids for power transmission are usually distributed inside the buildings. These power grids often transmit AC voltages in the range of 100 volts to 240 volts with an alternating frequency of 50~60 Hertz, depending on the power specifications of individual countries. Therefore, when a human body is touching the touch area 430 near the conducting wire 420, an AC voltage with a frequency of 5~60 Hertz will be brought onto the conducting wire 420 connected with the touch sensing circuit 410.

In an embodiment of the present invention, the DC voltage 418 is at ground potential. The second voltage variation is a voltage variation higher than the increase in potential of the ground potential, wherein the first voltage variation is a voltage variation lower than the decrease in potential of the AC voltage.

In an embodiment of the present invention, if the touch sensing circuit 410 is in the passive mode, and an object close to the touch area 430 near the conducting wire 420 is detected, the touch sensing circuit 410 then switches to the driving mode.

One with ordinary skill in the art can appreciate that measuring of the voltage variations of the conducting wire 420 can be carried out using a combination of components such as differential amplifiers, integrators, sample and hold circuits and etc. One characteristic of the present invention is that the same combination of electronic components is used for detecting the potential differences of the conducting wire 420 in both the driving and the passive modes.

Figure 4C:
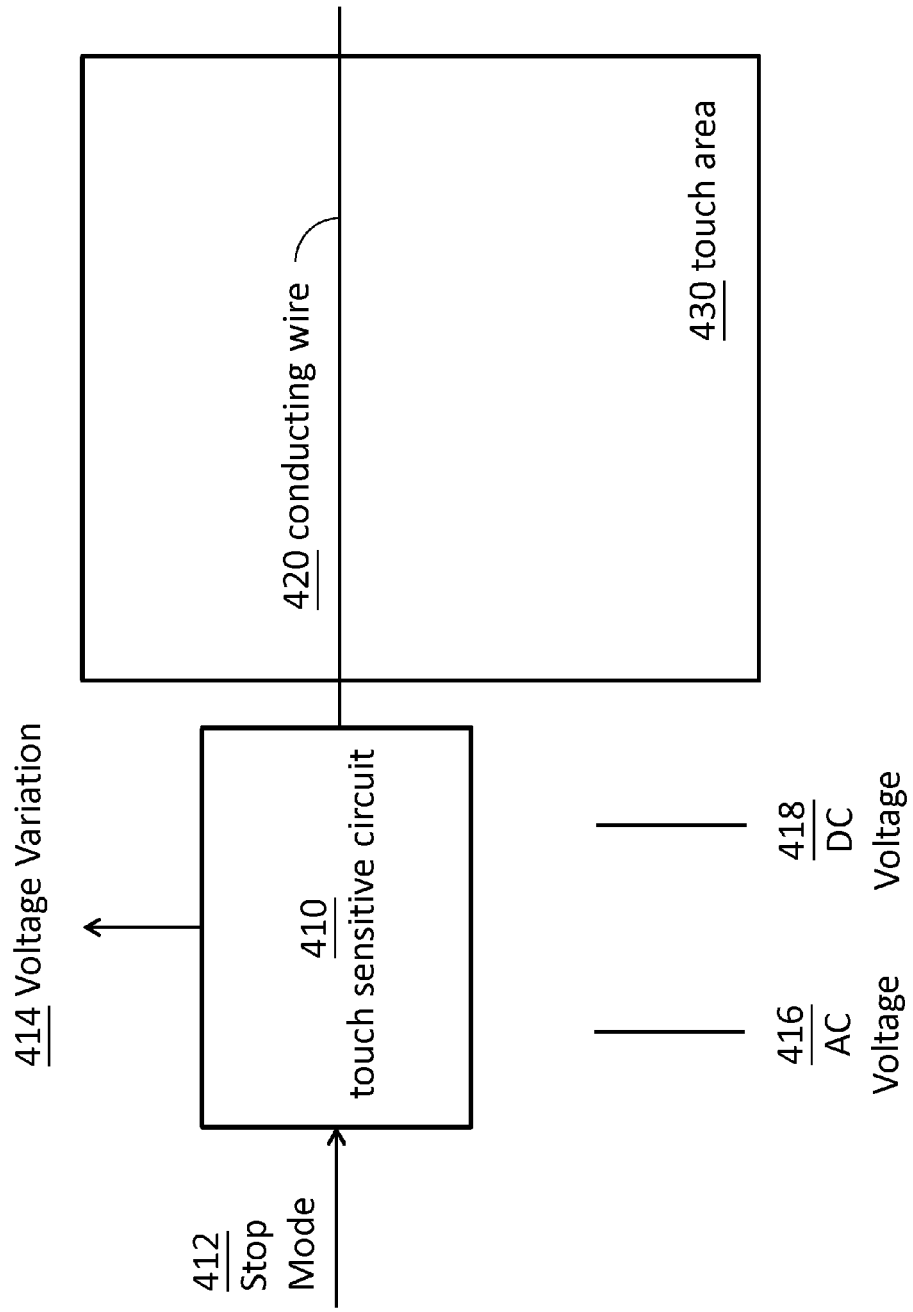
FIG. 4C is a schematic diagram illustrating the touch sensing circuit of FIG. 4A in a stop mode.

Referring to FIG. 4C, a schematic diagram illustrating the touch sensing circuit 410 of FIG. 4A in the stop mode is shown. Compared to FIG. 4A, the externally introduced operating mode 412 is the stop mode. Under the passive mode, the touch sensing circuit 410 prevents the conducting wire 420 from coupling to the AC voltage 416 or the DC voltage 418. The touch sensing circuit 410 itself also does not perform any measuring of the potential differences, therefore the conducting wire 420 and the touch sensing circuit 410 do not consume any power.

Figure 5:
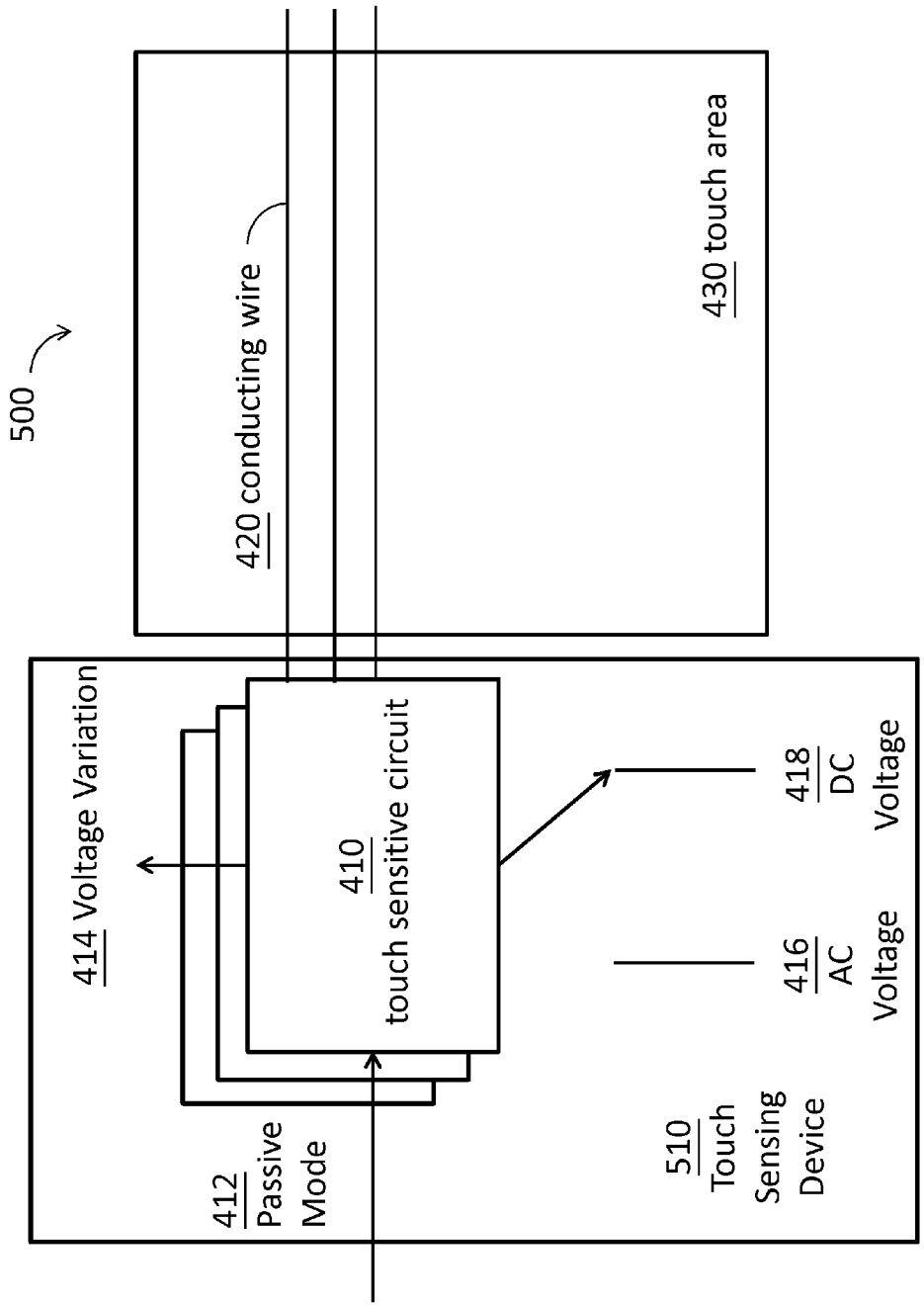
FIG. 5 is a schematic diagram illustrating a touch sensing system in accordance with the present invention.

In the embodiments shown in FIGS. 4A to 4C, a single touch sensing circuit is used for descriptions. Referring now to FIG. 5, a schematic diagram illustrating a touch sensing system 500 in accordance with the present invention is shown. In FIG. 5, most of the components are assigned with the same labels as before to indicate the same characteristics.

In the touch sensing system 500, at least a touch sensing circuit 510 is included. The touch sensing device 510 includes a plurality of touch sensing circuit 410 for connecting with a plurality of conducting wires 420 in a touch area 430. Although the plurality of conducting wires 420 are all aligned in the same direction in FIG. 5, one with ordinary skill in the art can appreciate that, in some embodiments, these conducting wires 420 may be aligned in two directions, such as in perpendicular horizontal and vertical directions, thus forming a coordinate system in the touch area 430. Similarly, although each touch sensing circuit 410 is shown to be connected to a corresponding conducting wire 420 in FIG. 5, one with ordinary skill in the art can appreciate that, in some embodiments, a single touch sensing circuit 410 can be connected to a plurality of conducting wires 420 via a selector in a time multiplexing manner, and measures the voltage variations of the plurality of conducting wires 420 in a time multiplexing manner.

The touch sensing device 510 receives a signal for operating mode 412. Similar to FIGS. 4A to 4C, the operating mode signal 412 can be one of the three operating modes shown in FIG. 3. Upon receiving the operating mode signal 412, the touch sensing device 510 will relay the signal 412 to each touch sensing circuit 410. Accordingly, each touch sensing circuit 410 will carry out operations under the respective mode according to the descriptions previously described.

Although FIG. 5 only shows the operating mode being the passive mode, one with ordinary skill in the art can appreciate the operating conditions in the driving and stop modes. Especially in the driving mode, the touch sensing device 510 may use one of self capacitive and mutual capacitive measuring methods.

Figure 6A:
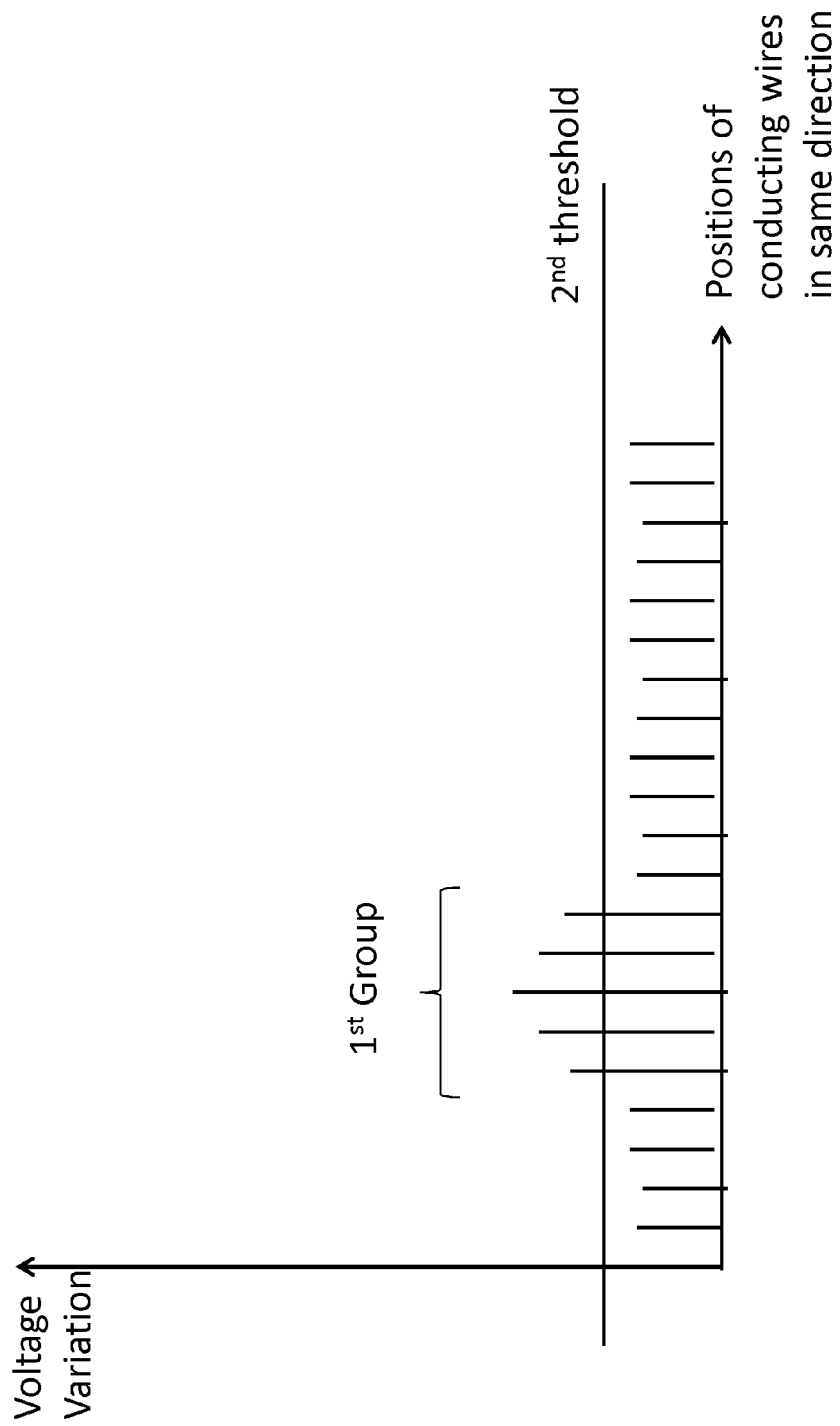
FIG. 6A is a schematic diagram illustrating a second voltage variation of each conducting wire measured in the passive mode.

Referring to FIG. 6A, a schematic diagram illustrating a second voltage variation of each conducting wire measured in the passive mode is shown. In FIG. 6A, a vertical axis indicates a second voltage variation on each conducting wire aligned in the same direction measured by each touch sensing circuit 410 of the touch sensing device 510, and a horizontal axis indicates the position of each conducting wire in that same direction.

A horizontal line is drawn for a second threshold of the second voltage variation. The touch sensing device 510 may use the graph drawn in FIG. 6A to find out each conducting wire that has a voltage variation exceeding the second threshold. Then, the continuously arranged conducting wires forms at least one group. In one embodiment, a conducting wire having the largest voltage variation is selected from each group as the coordinate position of this touch. In another embodiment, the position of center of gravity for each group is calculated using the values of voltage variations and used as the coordinate position of this touch.

One with ordinary skill in the art can appreciate that the graph shown in FIG. 6A is presented merely for illustration, the touch sensing device 510 may use other types of data representations to represent the positions of the conducting wires and their corresponding second voltage variations shown in FIG. 6A as long as it is in accordance with the principle of the present invention. In an embodiment where conducting wires covering the touch area are aligned in two directions, the touch sensing device 510 may record the second voltage variations of the conducting wires along these two directions and determine the coordinate position corresponding to these two directions, respectively.

Figure 6B:
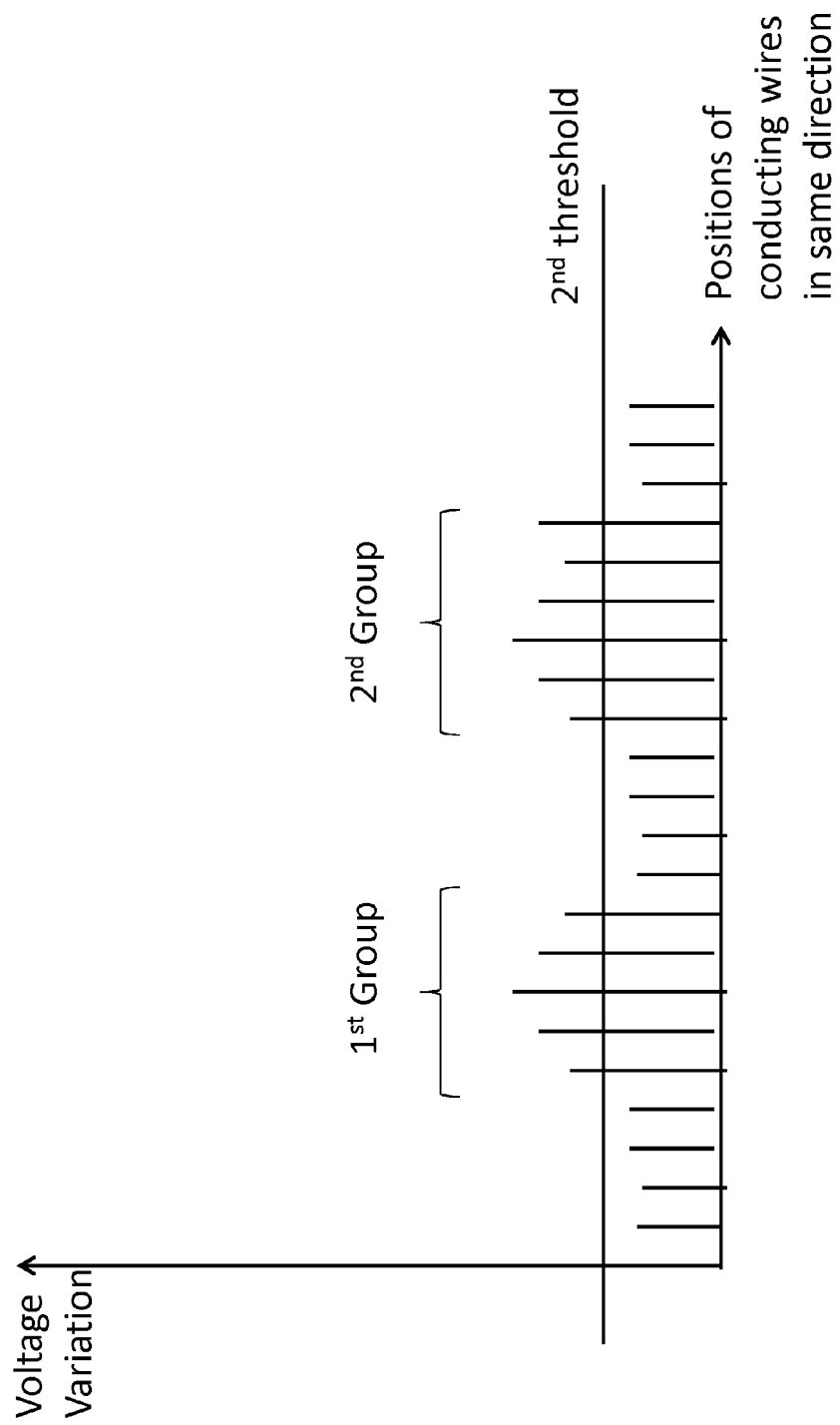
FIG. 6B is another schematic diagram illustrating a second voltage variation of each conducting wire measured in the passive mode.

Referring to FIG. 6B, a schematic diagram illustrating a second voltage variation of each conducting wire measured in the passive mode is shown. Compared to FIG. 6A, there are two groups of conducting wires exceeding the second threshold. If two or more objects are touching the touch area, corresponding peaks of second voltage variation will appear in the conducting wires along a particular direction. Similar to the embodiment shown in FIG. 6A, each conducting wire with a voltage variation exceeding the second threshold is found. Then, continuously arranged conducting wires are grouped together. Thereafter, in each group, a conducting wire with the largest voltage variation or the position of center of gravity of the group is determined as the coordinate position for the particular touch event.

In FIG. 6A, a vertical axis indicates a second voltage variation on each conducting wire aligned in the same direction measured by each touch sensing circuit 410 of the touch sensing device 510, and a horizontal axis indicates the position of each conducting wire in that same direction.

Referring to FIG. 7A, a schematic diagram illustrating single touch input under the passive mode is shown. In a touch area 700 having conducting wires in the horizontal and vertical directions, coordinate positions 710 in the horizontal and vertical directions are found by the touch sensing system using the second voltage variations shown in FIG. 6A. Accordingly, a pair of coordinates corresponding to the single touch event can then be found. After generating a coordinate pair, the touch sensing system may draw a movement trajectory of this coordinate pair by repeating the measuring method over a period of time.

Referring to FIG. 7B, a schematic diagram illustrating two touch input under the passive mode is shown. Similarly, in the touch area 700 having conducting wires in the horizontal and vertical directions, coordinate positions in the horizontal and vertical directions are found by the touch sensing system using the second voltage variations shown in FIG. 6B. Since two groups are found in each direction, there are two coordinate positions in each direction, resulting in four intersection points in FIG. 7B, which are labeled as 720a, 720b, 720c and 720d. These four intersection points form a rectangle.

Under the passive mode, points that may be pressed by a user are two diagonal points of this rectangle. In other words, pressing points 720a and 720d or pressing points 720b and 720c will result in the rectangle shown. Same as above, the touch sensing system may draw a movement trajectory of each coordinate pair by repeating the measuring method over a period of time. When the position of any point is changed, the original rectangle may be enlarged, reduced, moved or rotated. The touch sensing system has knowledge of the changes to this rectangle.

Since the second threshold in the passive mode is smaller than the first threshold of the driving mode, the passive mode is more susceptible to external interference. For example, in an embodiment where a touch area is stacked above a screen, if the touch sensing system is in the passive mode and the screen is turned on, then the optical interference from the screen may exceed the second threshold. Thus, in an embodiment of the present invention, when switching to the passive mode, the screen has to be turned off to avoid interfering with the sensing system.

In order to prevent interference under the passive mode, when in the passive mode, the touch sensing device 510 will switch to the driving mode only when the touch sensing circuits 410 of the touch sensing device 510 determines an object is close to a conducting wire 420 on the touch area 430 as well as one or a combination of the following conditions are satisfied: single touch position condition wherein the position of the object is a coordinate pair corresponding to the two directions above; single touch range condition wherein the position of the object is the coordinate pair corresponding to the two directions above and the coordinate pair is in a certain range of the coordinate system of the touch area; single touch movement condition wherein the position of the object is the coordinate pair corresponding to the two directions above and the coordinate pair is moving in a certain trajectory of the coordinate system of the touch area; two touch position condition, wherein the position of the object includes four coordinate pairs corresponding to the two directions above; two touch range condition, wherein the position of the object includes four coordinate pairs corresponding to the two directions above and a rectangle formed by the four coordinate pairs is in a certain range of the coordinate system of the touch area; two touch movement condition, wherein the position of the object includes four coordinate pairs corresponding to the two directions above and a rectangle formed by the four coordinate pairs is moving in a certain trajectory of the coordinate system of the touch area; two touch scaling condition, wherein the position of the object includes four coordinate pairs corresponding to the two directions above and the area of a rectangle formed by the four coordinate pairs is scaled above a certain ratio; two touch rotating condition, wherein the position of the object includes four coordinate pairs corresponding to the two directions above and the rotation of a rectangle formed by the four coordinate pairs exceeds a certain angle.

Figure 8B:
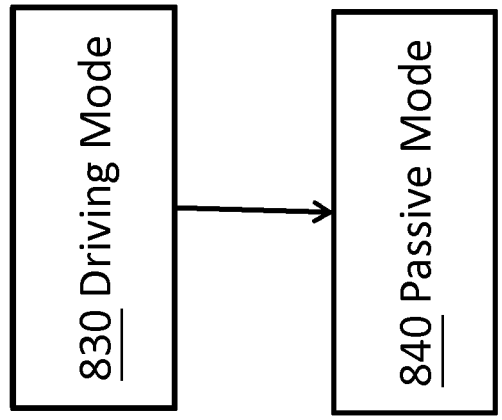
FIG. 8B is a flowchart illustrating another touch sensing method in accordance with an embodiment of the present invention.
Figure 8A:
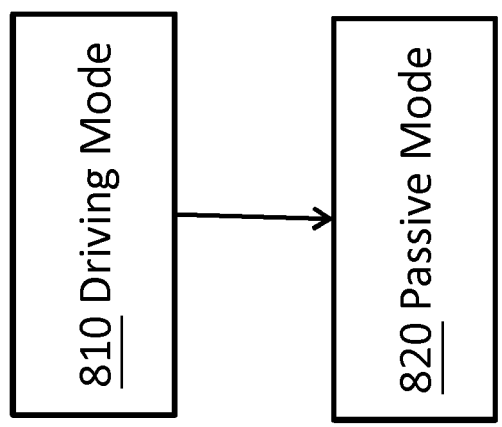
FIG. 8A is a flowchart illustrating a touch sensing method in accordance with an embodiment of the present invention.

Referring to FIG. 8A, a flowchart illustrating a touch sensing method in accordance with an embodiment of the present invention is shown. This method is applicable for measuring signal variation of a conducting wire in a touch area. The touch sensing method includes step 810. In step 810, a driving mode is entered to allow a conducting wire to be coupled to an AC voltage, and if a first voltage variation measured on the conducting wire exceeds a first threshold, then it is determined an object is approaching the touch area near the conducting wire. The touch sensing method further includes step 820. In step 820, a passive mode is entered to allow a conducting wire to be coupled to an DC voltage, and if a second voltage variation measured on the conducting wire exceeds a second threshold, then it is determined an object is approaching the touch area near the conducting wire. In measuring the second voltage variation, no AC voltage is provided to the conducting wire.

Referring to FIG. 8B, a flowchart illustrating another touch sensing method in accordance with an embodiment of the present invention is shown. This method is applicable to a touch sensing device. The touch sensing device is connected to a plurality of conducting wires sequentially arranged to measure signal variations of the conducting wires. The touch sensing method includes step 830. In step 830, a driving mode is entered to allow each of the conducting wires to be coupled to an AC voltage, and if a first voltage variation measured on a first conducting wire exceeds a first threshold, then it is determined an object is approaching the touch area near the first conducting wire. The touch sensing method further includes step 840. In step 840, a passive mode is entered to allow each of the conducting wires to be coupled to an DC voltage, and if a second voltage variation measured on the first conducting wire exceeds a second threshold, then it is determined an object is approaching the touch area near the first conducting wire. In measuring the second voltage variation, no AC voltage is provided to any of the conducting wires.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensing circuit connected to a conducting wire in a touch area for measuring a signal variation of the conducting wire comprising:
   in a driving mode, the touch sensing circuit allowing the conducting wire to be coupled to an AC voltage, and if the touch sensing circuit measuring a first voltage variation exceeding a first threshold, determining an object is approaching the conducting wire in the touch area; and
   in a passive mode, the touch sensing circuit allowing the conducting wire to be coupled to a DC voltage, and if the touch sensing circuit measuring a second voltage variation exceeding a second threshold, determining an object is approaching the conducting wire in the touch area, wherein in measuring the second voltage variation, no AC voltage is provided to the conducting wire.

2. The touch sensing circuit of claim 1, wherein the DC voltage is at ground potential, and the second voltage variation is a variation higher than a voltage increase of the ground potential, wherein the first voltage variation is a variation lower than a voltage decrease of the AC voltage.

3. The touch sensing circuit of claim 1, wherein the first threshold is larger than the second threshold.

4. The touch sensing circuit of claim 1, wherein if, in the passive mode, the touch sensing circuit determines an object is approaching the conducting wire the touch area, then the touch sensing circuit switches to the driving mode.

5. The touch sensing circuit of claim 1, further comprising a stop mode in which the touch sensing circuit stops measuring the signal variation of the conducting wire, wherein the touch sensing circuit periodically switches from the stop mode to the passive mode, and if, in the passive mode, the touch sensing circuit determines there is no object approaching the conducting wire near the touch area, then the touch sensing circuit switches from the passive mode back to the stop mode.

6. A touch sensing device comprising a plurality of touch sensing circuits, each touch sensing circuit connected to one of a plurality of conducting wires in a touch area for measuring a signal variation of the corresponding conducting wire, the touch sensing device comprising:
   in a driving mode, each touch sensing circuit allowing the corresponding conducting wire to be coupled to an AC voltage, and if a first touch sensing circuit measuring a first voltage variation on a first conducting wire exceeding a first threshold, determining an object is approaching the first conducting wire in the touch area; and
   in a passive mode, each touch sensing circuit allowing the corresponding conducting wire to be coupled to a DC voltage, and if a first touch sensing circuit measuring a second voltage variation on a first conducting wire exceeding a second threshold, determining an object is approaching the first conducting wire in the touch area, wherein in measuring the second voltage variation, no AC voltage is provided to the first conducting wire.

7. The touch sensing device of claim 6, wherein the DC voltage is at ground potential, and the second voltage variation is a variation higher than a voltage increase of the ground potential, wherein the first voltage variation is a variation lower than a voltage decrease of the AC voltage.

8. The touch sensing device of claim 6, wherein the first threshold is larger than the second threshold.

9. The touch sensing device of claim 6, wherein if, in the passive mode, the touch sensing circuit of the touch sensing device determines an object is approaching the first conducting wire the touch area, then the touch sensing device switches to the driving mode.

10. The touch sensing device of claim 6, wherein if, in the passive mode, one of the touch sensing circuits of the touch sensing device determines an object is approaching its corresponding conducting wire near the touch area, then the touch sensing device switches to the driving mode.

11. The touch sensing device of claim 6, wherein the plurality of conducting wires are divided into two groups of conducting wires in two directions covering the touch area, when in the passive mode, the touch sensing device switches to the driving mode only if one or more touch sensing circuits of the touch sensing device determine one or more object are close to the corresponding conducting wires on the touch area as well as one or a combination of the following conditions are satisfied:
   single touch position condition, wherein the position of the object is a coordinate pair corresponding to the two directions;
   single touch range condition, wherein the position of the object is the coordinate pair corresponding to the two directions, and the coordinate pair is in a certain range of the coordinate system of the touch area;

single touch movement condition wherein the position of the object is the coordinate pair corresponding to the two directions and the coordinate pair is moving in a certain trajectory of the coordinate system of the touch area;

two touch position condition, wherein the position of the object includes four coordinate pairs corresponding to the two directions;

two touch range condition, wherein the position of the object includes four coordinate pairs corresponding to the two directions and a rectangle formed by the four coordinate pairs is in a certain range of the coordinate system of the touch area;

two touch movement condition, wherein the position of the object includes four coordinate pairs corresponding to the two directions and a rectangle formed by the four coordinate pairs is moving in a certain trajectory of the coordinate system of the touch area;

two touch scaling condition, wherein the position of the object includes four coordinate pairs corresponding to the two directions and the area of a rectangle formed by the four coordinate pairs is scaled above a certain ratio; and two touch rotating condition, wherein the position of the object includes four coordinate pairs corresponding to the two directions and the rotation of a rectangle formed by the four coordinate pairs exceeds a certain angle.

12. The touch sensing device of claim 6, further comprising a stop mode in which the touch sensing circuits stop measuring the signal variation of the conducting wires, wherein the touch sensing device periodically switches from the stop mode to the passive mode, and if, in the passive mode, the touch sensing circuits determine there is no object approaching the corresponding conducting wires near the touch area, then the touch sensing device switches from the passive mode back to the stop mode.

13. The touch sensing device of claim 6, wherein when in the driving mode, the touch sensing circuits of the touch sensing device are mutual capacitive or self capacitive.

14. The touch sensing device of claim 6, wherein when in the passive mode and a plurality of second voltage variations of conducting wires sensed by the touch sensing circuits of the touch sensing device are larger than the second threshold, the touch sensing device groups the conducting wires with the second voltage variations larger than the second threshold into at least one contiguous group, in each contiguous group, a coordinate position of a touch is calculated using one of the following methods:

a coordinate position of a conducting wire with the largest second voltage variation in the contiguous group is the coordinate position; and a coordinate position of the center of gravity of the conducting wires in the contiguous group is the coordinate position.

15. The touch sensing device of claim 14, wherein the conducting wires are divided into two groups of conducting wires in two directions covering the touch area, the coordinate position corresponds to a pair of coordinates in the two directions.

16. A touch sensing system comprising:
a plurality of conducting wires covering a touch area; and
a touch sensing device including a plurality of touch sensing circuits, each touch sensing circuit connected to one of a plurality of conducting wires in a touch area for measuring a signal variation of the corresponding conducting wire, wherein the touch sensing device includes:
in a driving mode, each touch sensing circuit allowing the corresponding conducting wire to be coupled to an AC voltage, and if a first touch sensing circuit measuring a first voltage variation on a first conducting wire exceeding a first threshold, determining an object is approaching the first conducting wire in the touch area; and
in a passive mode, each touch sensing circuit allowing the corresponding conducting wire to be coupled to a DC voltage, and if a first touch sensing circuit measuring a second voltage variation on a first conducting wire exceeding a second threshold, determining an object is approaching the first conducting wire in the touch area, wherein in measuring the second voltage variation, no AC voltage is provided to the first conducting wire.

17. A touch sensing method applicable for measuring a signal variation of a conducting wire in a touch area, the method comprising:
switching to a driving mode to allow the conducting wire to be coupled to an AC voltage, and if measuring a first voltage variation exceeding a first threshold, determining an object is approaching the conducting wire in the touch area; and
switching to a passive mode to allow the conducting wire to be coupled to a DC voltage, and if measuring a second voltage variation exceeding a second threshold, determining an object is approaching the conducting wire in the touch area, wherein in measuring the second voltage variation, no AC voltage is provided to the conducting wire.

18. A touch sensing method applicable to a touch sensing device, the touch sensing device connected to a plurality of sequentially arranged conducting wires for measuring a signal variation of each of the conducting wires, the method comprising:
switching to a driving mode to allow each of the conducting wires to be coupled to an AC voltage, and if measuring a first voltage variation on a first conducting wire exceeding a first threshold, determining an object is approaching the conducting wire in the touch area; and
switching to a passive mode to allow each of the conducting wires to be coupled to a DC voltage, and if measuring a second voltage variation on the first conducting wire exceeding a second threshold, determining an object is approaching the conducting wire in the touch area, wherein in measuring the second voltage variation, no AC voltage is provided to any of the conducting wires.

* * * * *